Figure 55:
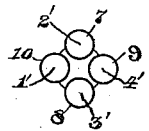

(No Model.)  
7 Sheets—Sheet 1.
A. D. EMERY.
METHOD OF WEAVING TWO-PLY FIGURED FABRICS.
No. 441,231. Patented Nov. 25, 1890.

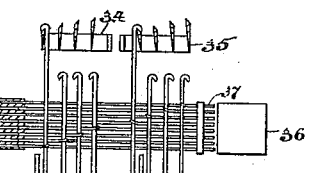

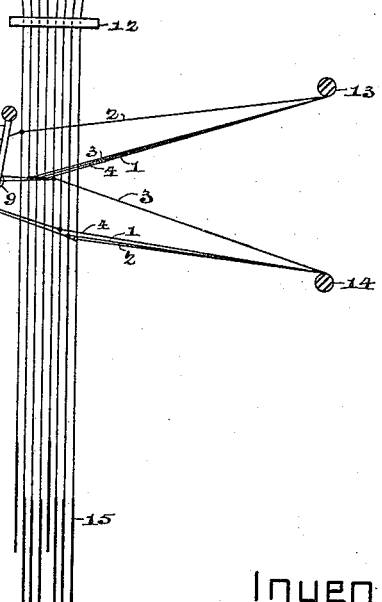
Witnesses.  
a. M. Jones.  
W. E. Quimby.
Inventor.  
Abram D. Emery  
Edw. E. Quimby  
by  
Attorney.

(No Model.) 7 Sheets—Sheet 2.
A. D. EMERY.
METHOD OF WEAVING TWO-PLY FIGURED FABRICS.
No. 441,231. Patented Nov. 25, 1890.
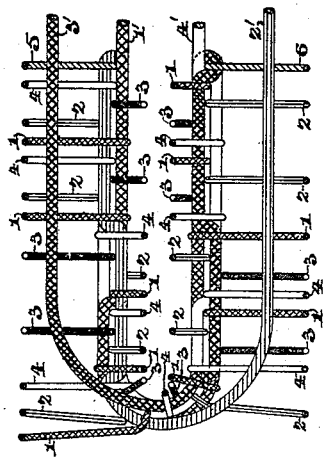
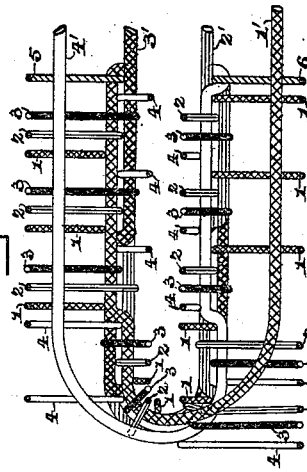
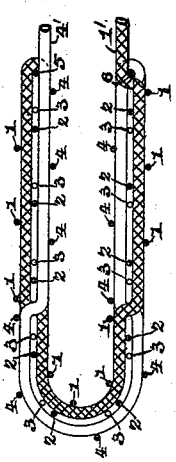
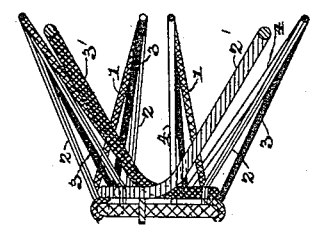
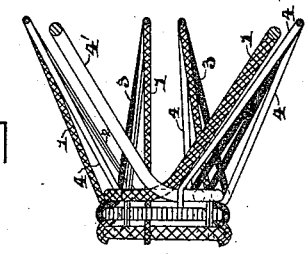
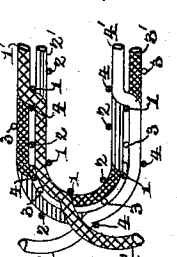
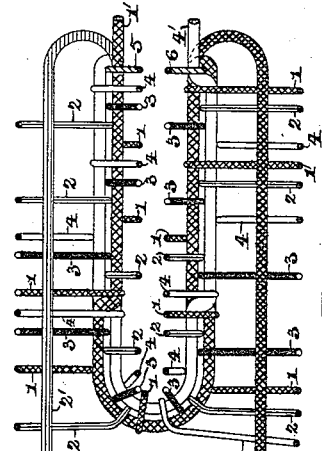
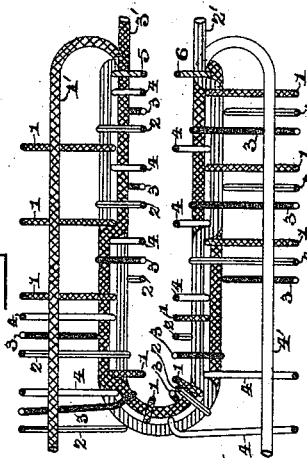
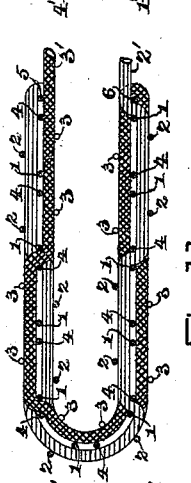
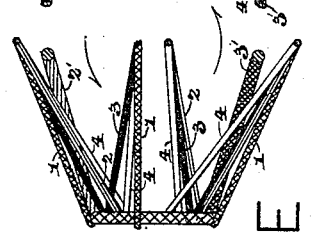
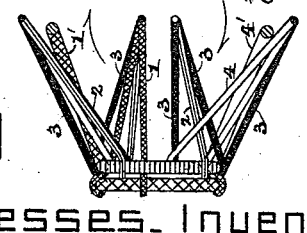

(No Model.) 7 Sheets—Sheet 3.
A. D. EMERY.
METHOD OF WEAVING TWO-PLY FIGURED FABRICS.
No. 441,231. Patented Nov. 25, 1890.
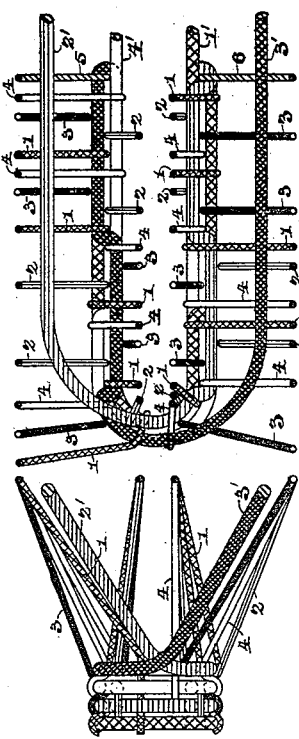
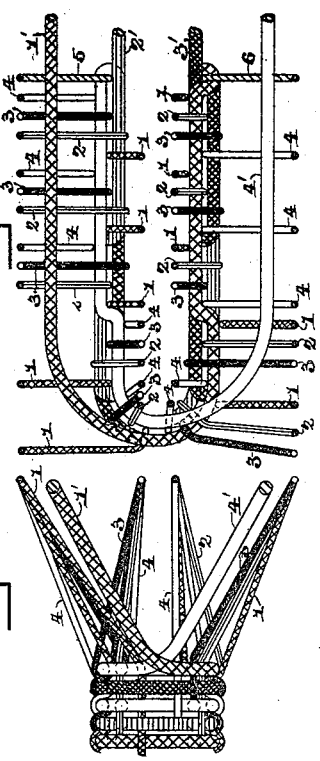
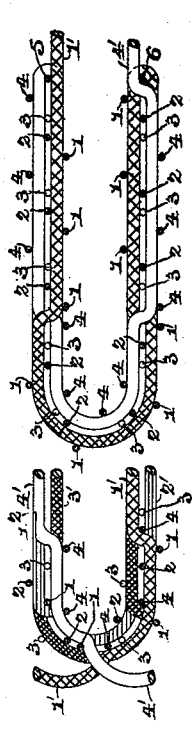
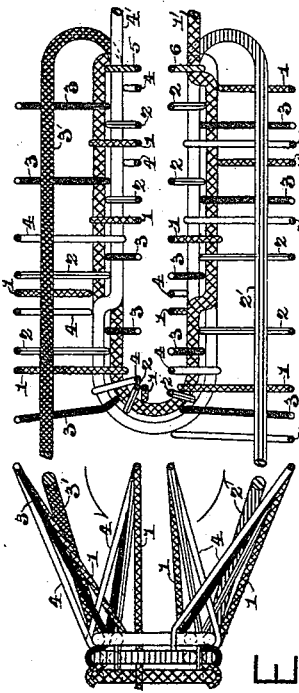
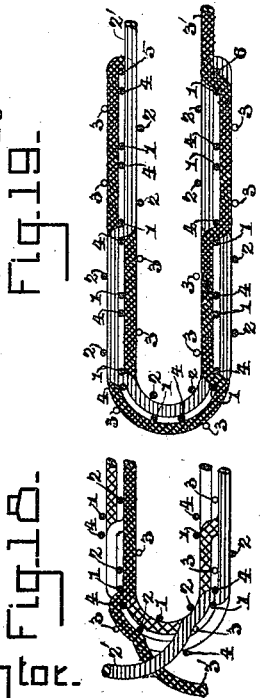
Witnesses. Inventor.
a. m. Jones. Abram D. Emery.
W. E. Quimby by Edw. E. Quimby, Attorney.

(No Model.) 7 Sheets—Sheet 4.

A. D. EMERY.
METHOD OF WEAVING TWO-PLY FIGURED FABRICS.

No. 441,231. Patented Nov. 25, 1890.

Witnesses.
a. M. Jones.
Wm E. Quimby

Inventor.
Abram D. Emery
by Edw. E. Quimby
Attorney.

(No Model.) 7 Sheets—Sheet 5.

A. D. EMERY.
METHOD OF WEAVING TWO-PLY FIGURED FABRICS.

No. 441,231. Patented Nov. 25, 1890.

Witnesses.
A. M. Jones
Wm E. Quimby

Inventor.
Abram D. Emery
by Edw. E. Quimby
Attorney.

(No Model.) 7 Sheets—Sheet 6.
A. D. EMERY.
METHOD OF WEAVING TWO-PLY FIGURED FABRICS.
No. 441,231. Patented Nov. 25, 1890.
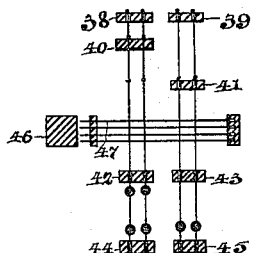
Fig. 42.
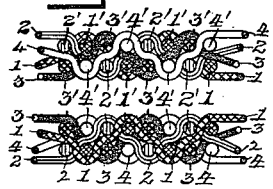
Fig. 63.
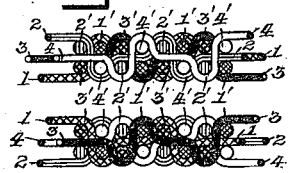
Fig. 64.
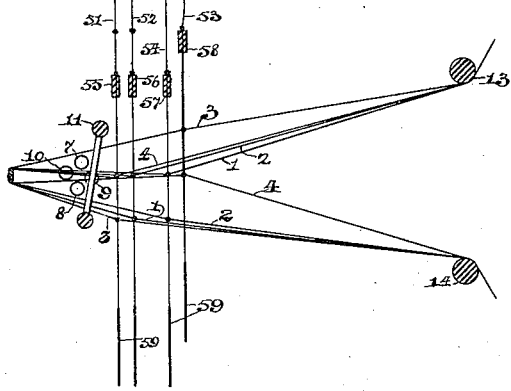
Witnesses.
a. M. Jones.
W. E. Quimby.
Inventor.
Abram D. Emery
by
Edw. E. Quimby,
Attorney.
THE NORRIS PETERS CO., PHOTO-LITHO., WASHINGTON, D. C.

(No Model.) 7 Sheets—Sheet 7.
A. D. EMERY.
METHOD OF WEAVING TWO-PLY FIGURED FABRICS.
No. 441,231. Patented Nov. 25, 1890.
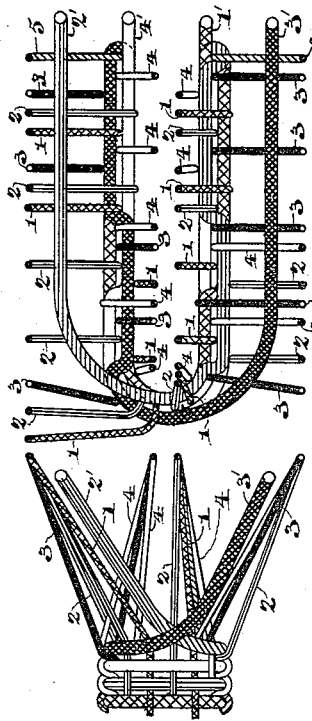
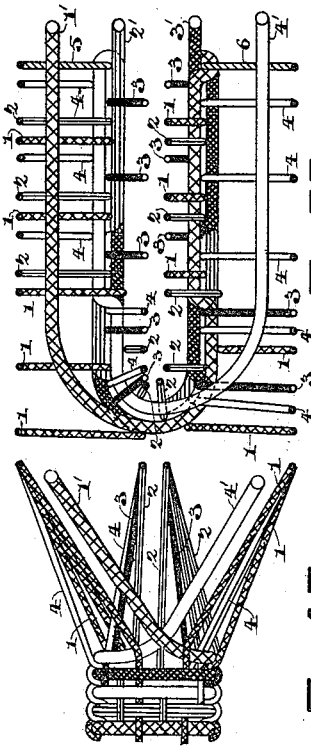
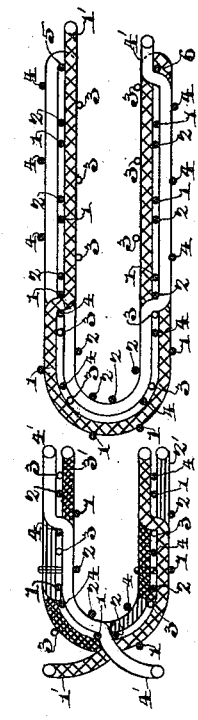
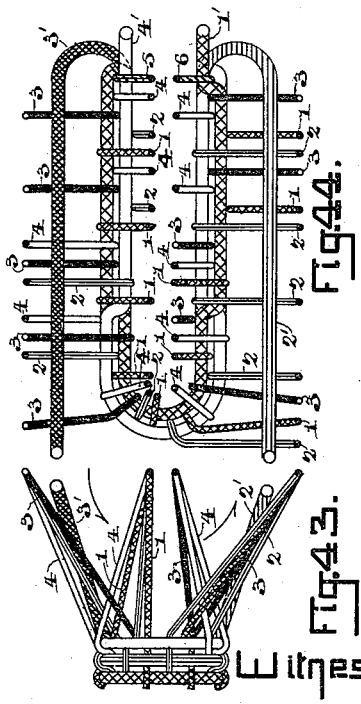
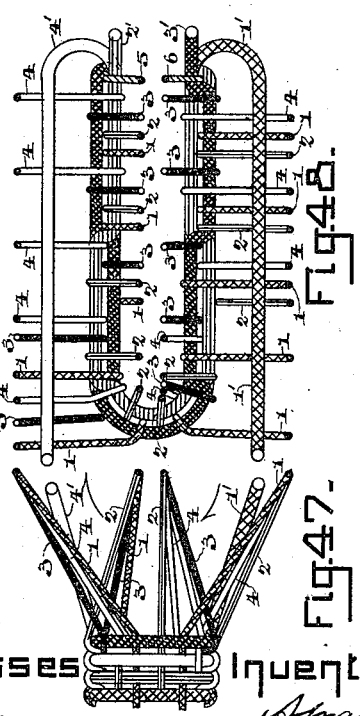
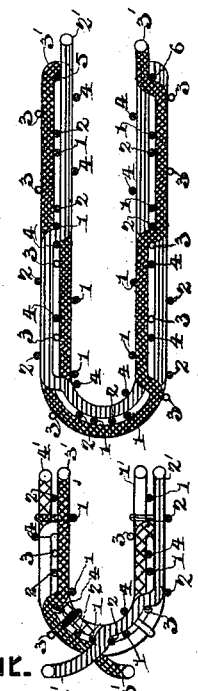

UNITED STATES PATENT OFFICE.

ABRAM D. EMERY, OF TAUNTON, MASSACHUSETTS.

METHOD OF WEAVING TWO-PLY FIGURED FABRICS.

SPECIFICATION forming part of Letters Patent No. 441,231, dated November 25, 1890.

Application filed February 3, 1890. Serial No. 339,032. (No specimens.)

*To all whom it may concern:*

Be it known that I, ABRAM D. EMERY, a citizen of the United States, residing at Taunton, in the county of Bristol and State of Massachusetts, have invented a certain new and useful Method of Weaving Two-Ply Figured Fabrics, of which the following is a full description.

My invention relates to the art of weaving two-ply figured fabrics of a width greater than that of the reed, as more broadly set forth in Letters Patent of the United States No. 415,146, issued to me November 12, 1889. The method set forth in the said patent consists, generally speaking, in weaving the fabric in two parts, side by side, in the loom, using two distinct weft-threads, which are simultaneously passed through the two parts of the fabric—one through each part—and which are contained on the face and back of the fabric for any required distance, the space occupied by one weft-thread on one side being occupied by the other weft-thread in the corresponding portion of the opposite side. The fabric is a regular two-ply figured goods composed of two sets of chain-threads and two weft-threads of different color, one for the figure and one for the ground. The fabric is formed in two parts, one over or alongside the other, and a figure and ground thread are passed simultaneously through the two sheddings or openings of the opposite parts. At one shedding the figure-thread is passed through one portion and a ground-thread through the opposite portion, and at the next shedding a ground-thread is carried through the part previously filled with a figure-thread, the opposite part previously filled with a ground-thread being filled with a figure-thread. Thus one side is shed for figure and the opposite side is shed for ground. At the next shedding the side that was shed for figure is shed for ground and the one that was shed for ground is shed for figure. The sheddings are made over or alongside one another and the two weft-threads are carried through them, say, from the stationary boxes on the rear of the loom to the transferring-boxes on the front of the loom, where they are shifted in their positions, the one received into the top being transferred to the bottom and the one received in the bottom being transferred to the top. In that specification the chain-threads are of two colors, one-half of each color, the weft-threads being of the colors to match the chain-threads. The fabric is formed of two colors, one being the figure and the other the ground.

In my present application the chain-threads are divided into two parts, as before—that is, figure and ground—but each of these parts is again subdivided into two parts of different color, thus making two colors for the figure and two for the ground, or four colors and four series of chain-threads in all. There are likewise four weft-threads, one for each of the different colors of chain-threads, two forming the figure and two forming the ground of the fabric. Dividing the weft-threads and their corresponding chain-threads into two series, white and olive for the ground and black and red for the figure, I select them in pairs to operate the same. In pairing them off the usual method is to pair the black-figure thread with the olive-ground thread and the red-figure thread with the white-ground thread. When so paired, the threads are called "mate" threads; thus the white and red are "mates" and the black and olive are "mates." In the ordinary methods the weft-threads are passed across the loom in the following manner: Black, olive, red, and white in regular order from one selvage to the other, the chain-threads being shed in the order of figure and ground in succession, the first lift of chain raising all the black chain-threads for the face or over the black weft-thread, all the red chain-threads being left at rest, which brings them over the black weft-thread, where the latter shows on the back of the fabric. The next shedding would be for ground, and in this all the olive chain-threads would be lifted so as to be over the olive weft-thread, and would appear over the same on the face, and all the white chain-threads would be at rest, and would appear over the olive weft-thread on the back. The next shedding is for figure, and all the red chain-threads are lifted to place them over the red weft-thread and to cause them to appear over the same on the face, while all the black chain-threads are at rest, to place them over the red weft-thread on the back of the fabric, where such weft-thread appears on the back. The next shedding is for ground, and all the white chain-threads are raised to place the same over the white weft-thread, and the red chain-threads are at rest, so as to place the same over the white weft-thread on the back of the fabric, where the said weft appears on the back. In this manner of shedding at each shedding one-fourth of the chain-threads, or all those of the same color as the weft-thread about to be introduced, are raised by the journals, the raising of the chain-thread making the proper shedding for placing the weft-thread on the face of the fabric. In the parts in which it is desired to place the weft-thread on the back of the fabric the jacquard lifts in addition the two chain-threads of the opposite ply, leaving the remaining one chain-thread down—as, for example, when the shedding is to be made for the black weft-thread, the journals governing the black chain-threads are raised, and the journals for the red, white, and olive are at rest, while the jacquard is so timed as to act at this time only on the olive and white or ground chain-threads, which are lifted in the parts where it is desired to place the black weft-thread on the back, leaving the red chain-thread down or over the black weft-thread on the back of the fabric. At the next shedding the olive weft-thread is to be introduced, and the shedding is made by lifting the journal carrying the olive chain-threads, and in the part in which the olive weft-thread is to be on the back, the jacquard lifts the black and red chain-threads, leaving the white down. The next two sheddings are made in a like manner to suit the red and white weft-threads.

It is to be understood that the word "over" as here used refers to the position of the chain-threads as they appear in the completed fabric, and not to the position they assume in the loom in the process of formation. Thus on the face of the fabric the several weft-threads will have the same color chain-threads over them, while upon the back of the same the black weft will be covered by the red chain-thread, the red by the black, the olive by the white, and the white by the olive.

In the method of weaving which is the subject of my present invention the colored chain-threads are placed over the correspondingly-colored weft-threads on both sides of the fabric. I have also shown my invention as applied to the weaving of goods in which the several weft-threads will have the same color chain-threads over them upon the face, while on the back of the fabric the black weft-thread will be covered by the red chain-thread, the red by the black, the olive by the white, and the white by the olive, but the placing of the chain-threads over the correspondingly-colored weft-threads on both the face and the back of the fabric seems to produce a better effect.

In order to supply the requisite number of weft-threads and enable them to be passed in pairs simultaneously through the warp-threads, a shifting device is required on one side of the loom, so arranged that in each position two boxes will be presented, one to each part of each of the sheddings. These boxes may be arranged so as to slide or, preferably, to revolve about a common center, as I have illustrated in the accompanying drawings.

In order to have the weft-thread introduced in the proper unison with the sheddings, (which are here shown produced in the same order as in the before-mentioned patent, No. 415,146—that is, two sheddings for figure in succession and two for ground in succession,) a figure-thread and ground-thread are attached to the shuttles in what may be termed the "top boxes," and a figure-thread and a ground-thread in what may be termed the "bottom boxes." The figure weft-thread in a top box has its mate ground-thread in a bottom box, and the ground weft-thread in a top box has its mate figure-thread in a bottom box. The mating-threads are so arranged as to be presented to the sheddings at the same time. They are passed through the sheddings and returned and occupy opposite boxes to those from which they started. The boxes are then shifted so as to present to the sheddings the next set of boxes containing the other pair of threads, which are passed through and returned in the same manner. The shifting shuttle-boxes are again shifted so as to present the first set of boxes, the wefts in which are passed through and returned as before, but pass through opposite sides from those previously passed through and returned to their initial positions. The shifting shuttle-boxes are then shifted so as to present again the second pair of boxes, which are passed through the sheddings in the same manner as the previous ones and returned to their original positions.

It will be seen that in order to time the shuttles to suit the order of sheddings specified—that is, at the first shedding—shedding the top for the olive or ground thread and the bottom for black or figure, the olive-thread shuttle must be in the top box and the black in the bottom, the shuttles being passed through to the front and there reversed in position. The next shedding will be top for black or figure and the bottom for olive or ground. The shuttles are now in opposite boxes to those from which they started, the black in the top and the olive in the bottom, or figure thread in the top and ground in the bottom, while they started figure in the bottom and ground in the top.

In accordance with the order of shedding, as before mentioned, the next shedding will be figure in the top and ground in the bottom The shuttles to suit these sheddings are placed the red in the top and the white in the bottom and the threads are shed red for top and white for bottom. Through these sheddings the shuttles are passed to the front boxes and reversed in position.

The next shedding will be white or ground for top and red or figure for bottom. Through these sheddings the shuttles are passed—the white in the top and the red in the bottom—and in this position are in the opposite boxes to those from which they started.

The next shedding is top for black or figure and the bottom for olive or ground to suit the shuttles which are in opposite boxes to those from which they started. Up to this shedding the order of working the same is that of the before-mentioned patent, No. 415,146—viz., first, ground top and figure bottom; second, figure top and ground bottom; third, figure top and ground bottom, and, fourth, ground top and figure bottom. These four sheddings will take the shuttles from an initial position and return them to the same in the patent referred to, for the reason that there are but two shuttles used, which in the first two sheddings reverse their positions and in the next two return to their original positions. In the present case, there being two figure-threads and two ground-threads, or four in all, the shuttles can be arranged so as to time with the sheddings by placing a figure and ground thread in the top and the mate figure and ground threads in the bottom and working over the same; but at the end of four sheddings the order will have to be reversed or altered to suit the positions of the weft-threads, which are in opposite sides of the same. This necessitates the beginning of the first of the second series of four sheddings with the figure-thread on top, whereas, according to the order as before worked over, it would have been for ground-thread on top.

The fifth shedding will be top for black or figure thread and the bottom for olive or ground thread. Through these sheddings the shuttles are passed to the front boxes and reversed in position, the olive thread being passed to the top and the black thread to the bottom position. The next or sixth shedding is top for olive or ground and bottom for black or figure. Through this shedding the weft-threads are passed to the rear boxes, placing the olive thread in the top and the black in the bottom, which is their original position.

The seventh shedding is top for white or ground thread and bottom for red or figure thread, through which the shuttles are passed to the front boxes. There they are reversed in position as before, and the next or eighth shedding is top for red or figure thread and the bottom is for white or ground thread. The shuttles are passed to the rear boxes and are then in their original positions. This completes the sequence of the positions of the shuttles, all having been passed from their initial positions in the rear boxes through the fabric and returned to the position from which they started.

It will be observed that it requires four sheddings to pass the shuttles from the front to the rear boxes and four to pass them from the rear boxes to the front. In the said patent, No. 415,146, before referred to, in which two colors were used, but four sheddings were required to return the shuttles to their original positions, while in this case, where four colors are used, there are required eight sheddings to so return the shuttles to their original positions, or in each case twice the number of sheddings that there are colors. This order of shedding may be altered from that just described if we so elect, as if we place the two figure weft-threads in the top boxes and their mate ground-threads in the rear boxes, so that the mate figure and ground weft-threads are presented to the sheddings at the same time, we may arrange the sheddings to suit the same by shedding in the following order: first, top for figure and bottom for ground; second, top for ground and bottom for figure; third, top for figure and bottom for ground; fourth, top for ground and bottom for figure; fifth, top for ground and bottom for figure; sixth, top for figure and bottom for ground; seventh, top for ground and bottom for figure, and the eighth, top for figure and bottom for ground. This order will be as follows: taking the sheddings of the top, first, black or figure; second, olive or ground; third, red or figure; fourth, white or ground; fifth, olive or ground; sixth, black or figure; seventh, white or ground, and the eighth, red or figure. It will thus be seen that the order in the first four sheddings is black, olive, red, and white, and the second four is olive, black, white, and red.

The order of the sheddings in the before-mentioned manner of sheddings are olive, black, red, and white, and the second four are black, olive, white, and red. Either of these ways of sheddings may be used as desired and produce the same result in the fabric.

In the drawings I have shown several ways of arranging the cords for operating the chain-threads, so as to place the chain-threads over their own weft-threads on the face and back or over their own weft-thread on the face and the opposite weft-thread on the back, as will be described in detail hereinafter.

Figure 1:
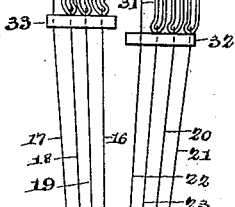

In the accompanying drawings, forming part of this specification, Figure 1 is a diagram showing the component parts of a loom, so far as is necessary to illustrate my invention. Figs. 3, 5, 7, and 9 of Sheet 2 are cross-sections of the first four sheddings, taken in front of the reed, with the threads separated and enlarged. Figs. 2, 4, 6, and 8 of Sheet 2 are side views of these four sheddings, taken on the front side of the loom or on the side where the shuttles are reversed. Fig. 10 shows a cross-section of the threads and the position of the same with reference to the weft-threads at the completion of the beating up of the weft-threads, as shown in Fig. 3. Fig. 11 is a cross-section of the threads and the position they occupy at the completion of the beating up of the same, as shown in Fig. 5. Fig. 12 of Sheet 2 is a cross-section of the threads and the position of the same at the beating up of the same, as shown in Fig. 7.

Figure 56:
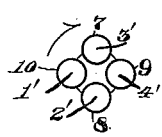
Figure 57:
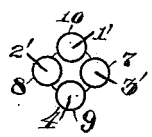
Figure 58:
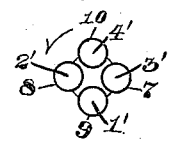
Figure 59:
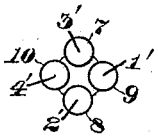
Figure 60:
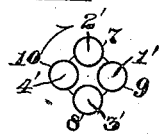
Figure 61:
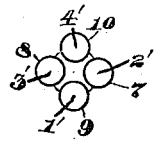
Figure 62:
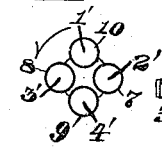
Figure 26:
Figure 27:
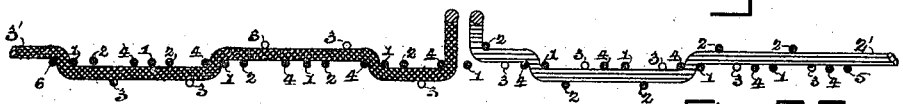
Figure 28:
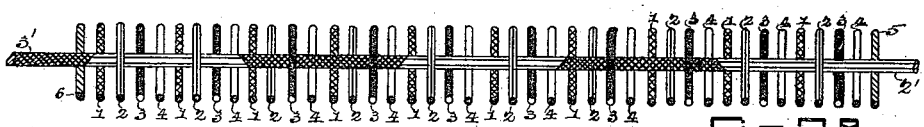
Figure 29:
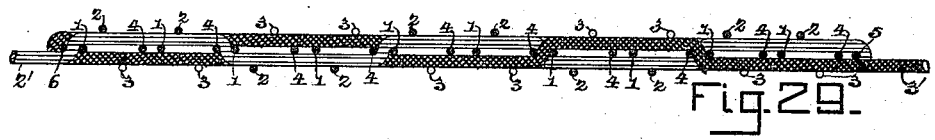
Figure 30:
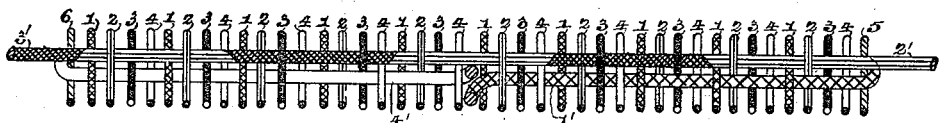
Figure 31:
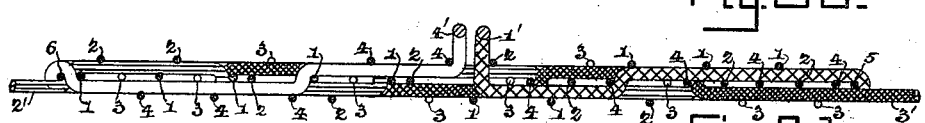
Figure 32:
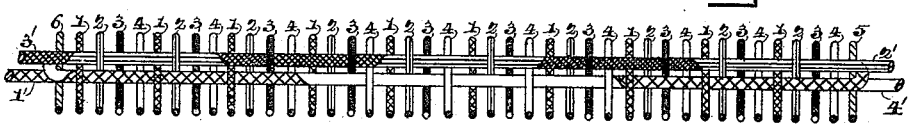
Figure 33:
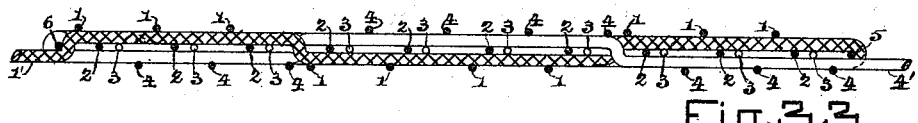
Figure 34:
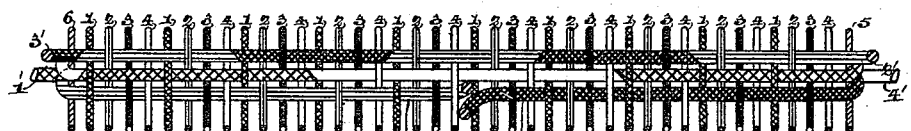
Figure 35:
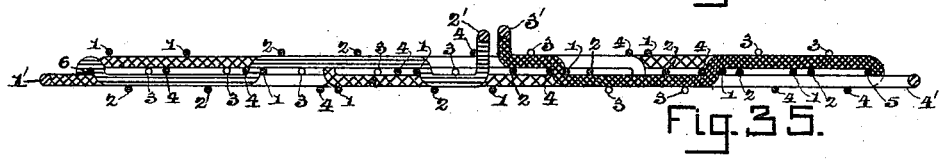
Figure 36:
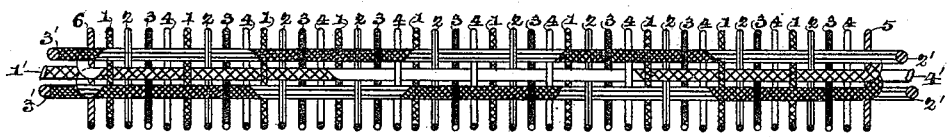
Figure 37:
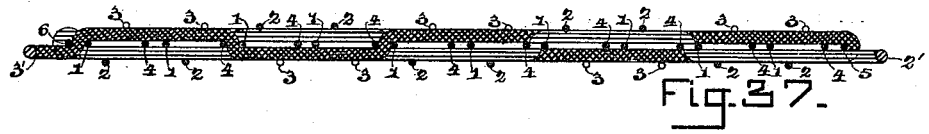
Figure 38:
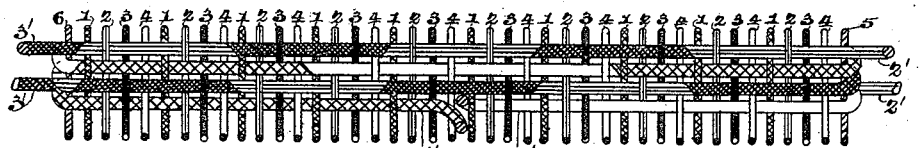
Figure 39:
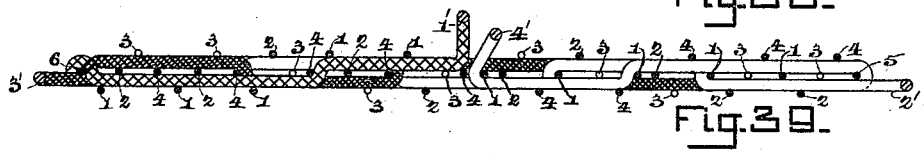
Figure 40:
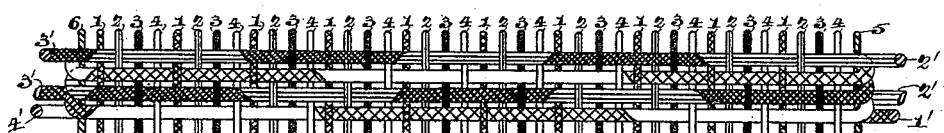
Figure 41:
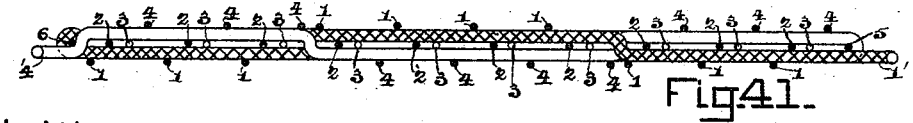

Fig. 13 is a cross-section of the chain-threads and shows the position of the weft-threads as they appear when beaten up, as shown in Fig. 9. Figs. 15, 17, 19, and 21 are cross-sections of the chain-threads as before and show the positions of the same in the fifth, sixth, seventh, and eighth sheddings. Figs. 14, 16, 18, and 20 are side views of the above sheddings, taken on the front side of the loom. Fig. 22 is a cross-section of the chain-threads and shows the position of the weft-threads at the center when the threads are beaten up in the position as shown in Fig. 15, Sheet 3. Fig. 23 is a like cross-section and shows the position of the threads when beaten up, as shown in Fig. 7 of Sheet 3. Fig. 24 is a like cross-section and shows the position of the threads when beaten up in the position as shown in Fig. 19 of Sheet 3. Fig. 25 of Sheet 3 is a like cross-section of the threads and shows the position of the threads as they appear when beaten up in the position as shown in Fig. 21 of Sheet 3. Fig. 26 of Sheet 4 shows the position of the threads as they appear looking on the face of the fabric when beaten up in the first shedding, as shown in Fig. 3 of Sheet 2. Fig. 27 is a cross-section of Fig. 26 of Sheet 4 and of Fig. 10, Sheet 2, opened out flat. Fig. 28 of Sheet 4 shows the position of the threads as they appear upon the face of the fabric when beaten up in Figs. 5 and 11 of Sheet 2. Fig. 29 of Sheet 4 is a cross-section of the threads, as seen in Fig. 28 and of Fig. 11, Sheet 2, opened out flat. Fig. 30 of Sheet 4 is a view looking on the face of the fabric and of the threads, as shown in Figs. 7 and 12 of Sheet 2, beaten up in the fabric. Fig. 31 is a cross-section of Fig. 30 and of Figs. 7 and 12 of Sheet 2 opened out flat. Fig. 32 of Sheet 4 show the position of the threads, as seen in Figs. 9 and 13 of Sheet 2, opened out flat and looking on the face of the fabric. Fig. 33 of Sheet 4 is a cross-section of Fig. 32 of Sheet 4 and Figs. 9 and 13 of Sheet 2, opened out flat. Fig. 34 of Sheet 5 is a view of the face of the fabric and of the threads, as seen in Figs. 15 and 22, Sheet 3, opened out flat. Fig. 35 of Sheet 5 is a cross-section of Fig. 34 of Sheet 5 and of Figs. 15 and 22 of Sheet 3. Fig. 36 of Sheet 5 is a view of the face of the fabric, as seen upon beating up the threads, as shown in Figs. 17 and 23 of Sheet 3, opened out flat. Fig. 37 of Sheet 5 is a cross-section of the threads of Fig. 36, Sheet 5, and of Figs. 17 and 23 of Sheet 3, opened out flat. Fig. 38 of Sheet 5 is a view of the face of the fabric as seen upon beating up the threads, as shown in Figs. 19 and 24 of Sheet 3, opened out flat. Fig. 39 of Sheet 5 is a cross-section of the threads, as seen in Fig. 38 of Sheet 5 and of Figs. 19 and 24 of Sheet 3, opened out flat. Fig. 40 of Sheet 5 is a view of the face of the fabric, as seen upon beating up the threads, as shown in Figs. 21 and 25 of Sheet 3, opened out flat. Fig. 41 of Sheet 5 is a cross-section of the threads of Fig. 40, Sheet 5, and of Figs. 21 and 25 of Sheet 3, opened out flat. Fig. 42 of Sheet 6 is a diagram of the component parts of a loom, arranged as in Fig. 1, Sheet 1, showing the arrangement of heddle-cords, journals, &c. Fig. 44 of Sheet 7 is a cross-section of the first shedding, as illustrated in Fig. 3, Sheet 2, and is like the same in all respects, except that the chain-threads being raised and lowered by the journals, as shown in Fig. 42, Sheet 6, the opposite figure chain-thread is on the back from that on the face. Fig. 43 of Sheet 7 is a side view of Fig. 44, taken on the front of the loom. Fig. 46 is a like cross-section of the second shedding, as shown in Fig. 5 of Sheet 2. Fig. 45 of Sheet 7 is a side view of Fig. 46 and is similar to Fig. 4, Sheet 2. Fig. 48 of Sheet 7 is a cross-section of the third shedding, and is like that of Fig. 7 of Sheet 2. Fig. 47 of Sheet 7 is a side view of Fig. 48 of Sheet 7, and is similar to Fig. 6 of Sheet 2. Fig. 50 of Sheet 7 is a cross-section of the fourth shedding, and is like Fig. 9 of Sheet 2. Fig. 49 of Sheet 7 is a side view of Fig. 50 of Sheet 7, and is like Fig. 8, Sheet 2. Fig. 51 of Sheet 7 shows the position of the threads, as seen in Fig. 44 of Sheet 7, beaten up into the fabric, and is like Fig. 10 of Sheet 2. Fig. 52 of Sheet 7 shows the position of the threads, as shown in Fig. 46, beaten up into the fabric, and is like Fig. 11, Sheet 2. Fig. 53 of Sheet 7 is a cross-section of the threads, and shows the position when beaten up, as seen in Fig. 48 of Sheet 7, and is like Fig. 12 of Sheet 2. Fig. 54 of Sheet 7 is a cross-section of the threads, and shows the position taken by the threads when beaten up, as seen in Fig. 50, Sheet 7, and is similar to Fig. 13 of Sheet 2. Fig. 55 of Sheet 1 shows the position of the shuttle-boxes on the rear of the loom at the first shedding and the threads attached thereto. Fig. 56 of Sheet 1 shows the position of the same shuttle-boxes at the second shedding. Fig. 57 of Sheet 1 shows the position of the shuttle-boxes at the third shedding. Fig. 58 of Sheet 1 shows the position of the shuttle-boxes at the fourth shedding. Fig. 59 of Sheet 1 shows the position of the shuttle-boxes at the fifth shedding. Fig. 60 of Sheet 1 shows the position of the shuttle-boxes at the sixth shedding. Fig. 61 of Sheet 1 shows the position of the shuttle-boxes at the seventh shedding. Fig. 62 of Sheet 1 shows the position of the shuttle-boxes at the eighth shedding. Fig. 63 of Sheet 6 is a cross-section of the weft-threads, showing the course taken by the chain-threads in the manner of shedding, as illustrated in Fig. 1 of Sheet 1, in which the same color chain-thread is over the same weft-thread on the face and back of the fabric. Fig. 64, Sheet 6, is a like cross-section of the weft-threads and shows the chain-threads as they appear on the face and back of the fabric when the same color chain-thread is not over the same color weft-thread on the face and back of the fabric.

Referring particularly to Fig. 1, Sheet 1, the numeral 1 indicates the series of red chain-threads; 2, the olive chain-threads; 3, the black chain-threads, and 4 the white chain-threads.

The numeral 1' indicates the red weft-thread; 2', the olive weft-thread; 3', the black weft-thread, and 4' the white weft-thread.

The numerals 7, 8, 9, and 10 indicate the shuttle-boxes on the rear of the loom; 11, the reed; 12, the comber-board through which the cords pass; 13, the upper whip-roller over which the upper chain passes; 14, the lower whip-roller over which the lower chain passes; 15, the weights for giving tension to the harness-cords.

The numeral 16 indicates the cord governing the chain-thread 1; 17, that governing thread 2; 18, that governing thread 3, and 19 that governing thread 4 of the upper chain; and 20 indicates the cord governing the thread 1; 21, that governing thread 2; 22, that governing thread 3, and 23 that governing thread 4 of the lower chain. The cord 17 is attached to the needle 25. The cord 18 is attached to the needle 26. The cord 19 is attached to the needle 27, and the cord 16 is attached to the needle 24. The needles 24, 25, 26, and 27 are governed by the griff 34 and the bottom board 33. These needles govern the chain-threads of the upper half. The cord 20 is attached to the needle 28. The cord 21 is attached to the needle 29. The cord 22 is attached to the needle 30, and the cord 23 is attached to the needle 31. The needles 28, 29, 30, and 31 are governed by the griff 35 and the bottom board 32 and operate the chain of the lower half.

The needles are operated by the cross-wires 37, which are controlled by the card-cylinder 36, revolving a quarter of a revolution and presenting a card at every shedding. In the cross-section of the first shedding, as shown in Fig. 3, the upper half is shed for the olive or ground thread 2' by lifting the chain-threads 2 and lowering the threads 1, 3, and 4 for two squares from the upper selvage chain-thread 5, to place the weft-thread 2' on the face. The next two squares are shed so as to place the weft-thread 2' on the back of the fabric by lowering the chain-threads 2 and raising the threads 1, 3, and 4. The next single square is shed so as to place the weft-thread 2' on the face of the fabric by raising the chain-thread 2 and lowering the chain-threads 1, 3, and 4. The lower half is shed for the black weft-thread 3' by shedding the two squares to the left of the selvage chain-thread 6 so as to place the weft-thread 3' on the back of the fabric by lifting the chain-threads 3 and lowering the threads 1, 2, and 4. The next two squares are shed to place the weft-thread 3' on the face by lowering the chain-threads 3 and raising the threads 1, 2, and 4. The next single thread or square is shed so as to place the weft-thread 3' on the back of the fabric by raising the thread 3 and lowering the threads 1, 2, and 4. The rear shuttle-boxes are in the position as shown in Fig. 56, Sheet 1, with the shuttle carrying the thread 2' in the box 7 and the shuttle carrying the thread 3' in the box 8. In this position the weft-threads are driven through the sheddings, the thread 2' in the top and thread 3' in the bottom, and are seen in position in Fig. 2, and being beaten up form the first pick. The weft-threads will be seen in position in Fig. 10 of Sheet 2 extending out from the fabric, and in Figs. 26 and 27 of Sheet 4 opened out flat in plan and section, in which it will be seen that the chain-threads 3 are on the outside of the weft-thread 3' and threads 2 are on the outside of weft-thread 2' in all parts of the fabric, whether the weft-threads are on the face or back of the same.

The second shedding is shown in Fig. 5 of Sheet 2, in which the top is shed for the black weft-thread 3'. The two squares to the left of the selvage chain-thread 5 are shed so as to place the weft-thread on the back by lowering the chain-threads 3 and raising threads 1, 2, and 4. The next two squares are shed so as to place the weft-thread 3' on the face by raising threads 3 and lowering threads 1, 2, and 4. The next single square is shed to place the weft-thread on the back of the fabric by lowering thread 3 and raising threads 1, 2, and 4. The bottom is shed for the olive weft-thread 2'. The two squares to the left of the selvage chain-thread 6 are shed so as to place the weft-thread on the face by lowering the threads 2 and raising the chain-threads 1, 3, and 4. The next two squares are shed so as to place thread 2' on the back by raising the threads 2 and lowering threads 1, 3, and 4. The next single square is shed so as to place the weft-thread 2' on the face by lowering thread 2 and raising threads 1, 3, and 4. The shuttles in the front boxes are then turned in the direction indicated by the arrows in Fig. 2 and passed through the sheddings, as seen in Fig. 5, into the shuttle-boxes on the rear, as seen in Fig. 56, Sheet 1, the thread 3' into the box 7, and the thread 2' into the box 8. These boxes are in the same position as in the last shedding, but the shuttles have changed places. The thread 3' is in the top, while in the last shedding it was in the bottom, and thread 2', which is in the bottom, was in the top. The position the threads assume in passing each other at the front is seen in Fig. 4, Sheet 2, where the weft-threads are seen passing from one shedding into the opposite shedding, with the weft-thread 2' on the outside, or on the face of the turn or front side of the loom, as explained in Patent No. 415,139, granted to me November 12, 1889. The threads being beaten up form the second pick, and are seen in position in Fig. 11, where the chain-threads 2 on both the face and back are on the outside of weft-thread 2' and chain-threads 3 are on the outside of weft-thread 3' on the face and back, the threads 1 and 4 being between the same.

The position the threads occupy in the opened-out fabric is seen in Fig. 28, which shows the threads in plan as they appear looking on the face of the fabric, the chain-threads 2 being over weft-thread 2' and chain-threads 3 being over weft-threads 3' across the face of the fabric. This is also true of the back of the same.

Fig. 29 shows the opened-out fabric in section. The chain-threads 2 are on the outside of thread 2', where it appears either on the face or back, and chain-threads 3 are on the outside of the weft-thread 3', in the parts in which it appears in the fabric, either on the face or back of the same, the chain-threads 1 and 4 being between the weft-threads, and do not show. It will also be seen that the weft-thread 3' is in front of the weft-thread 2' in passing from face to back or back to face on the right-hand side of the fabric, and that the weft-thread 2' is in front of the weft-thread 3' on the left-hand side. This is due to the fact that the weft-thread that is passing from the center to the selvage is always in front of that passing to the center from the selvage, as more fully explained in United States Patents No. 415,146 and No. 415,147, issued to me November 12, 1889. This forms the first double pick. In all references to a "double pick" in this specification it is to be understood to be a layer of weft of both the weft-threads from selvage to selvage. The rear shuttle-boxes are moved in the direction indicated by the arrows in Fig. 56, Sheet 1, to the position as seen in Fig. 57, throwing the weft-threads 3' and 2' out of action and bringing the weft-threads 1' and 4' in position, the thread 1' in the top and 4' in the bottom position. The shedding to receive the same is shown in Fig. 7 of Sheet 2. The selvage chain-thread 5 is lowered, and the three squares to the left of the same are shed so as to have the thread 1' on the face by raising the chain-thread 1 and lowering the chain-threads 2, 3, and 4. The next two squares are shed to have the thread 1' on the back by lowering chain-thread 1 and raising threads 2, 3, and 4. The lower shedding is formed to suit the thread 4' by raising the selvage chain-thread 6 and shedding the next three squares to place the thread 4' on the back of the fabric by raising chain-threads 4 and lowering threads 1, 2, and 3. The next two squares are shed so as to place thread 4' on the face by lowering chain-thread 4 and raising threads 1, 2, and 3. Through these double sheddings the weft-threads are passed, thread 1' in the upper and thread 4' in the lower shedding, and are seen in position in Fig. 6. In this position they are beaten up into the fabric, and are seen in position at the center or turn in Fig. 12, Sheet 2, and in the position they assume in the opened-out fabric in Fig. 30 and in section in Fig. 31 of Sheet 4.

The next shedding, as seen in Fig. 9, is made by shedding the top for thread 4' and the bottom for thread 1'. This is accomplished by raising selvage chain-thread 5 of the upper half and shedding the next three squares to place thread 4' on the back of the fabric by lowering thread 4 and raising threads 1, 2, and 3. The next two squares are shed to place the thread 4' on the face by raising thread 4 and lowering threads 1, 2, and 3. The bottom shedding is formed by lowering selvage chain-thread 6 and shedding the next three squares so as to place the weft-thread 1' on the face by lowering chain-threads 1 and raising threads 2, 3, and 4. The next two squares are shed so as to place thread 4 on the back of the fabric by raising threads 1 and lowering threads 2, 3, and 4. The weft-threads 1' and 4' are in the front boxes and are turned in the direction indicated by the arrows in Fig. 6 to the position as seen in Fig. 8, and in this position are driven through the double shedding 4' in the top and 1' in the bottom, and are seen in place in Fig. 9 of Sheet 2. The threads are beaten up and form the second double pick, and are seen in position in Fig. 13 and in the opened-out fabric in plan in Fig. 32, Sheet 4, and in section in Fig. 33, wherein it will be seen that chain-threads 1 are over or on the outside of weft-thread 1', both on the face and back of the fabric, and that chain-thread 4 is likewise on the outside of weft-thread 4' on the face and back, and that chain-threads 2 and 3 are in the center, between weft-threads 1' and 4'. It will thus be seen that each of the four weft-threads is carried from the rear to the front and returned to the rear at the completion of the passage of the threads through the fourth double shedding. It will also be seen that the positions of the weft-threads are all reversed, those that were in the top being in the bottom and the reverse. This is seen upon examining Figs. 55 to 58. In Fig. 55 the weft-thread 2' is in the top and 3' is in the bottom position.

In Fig. 56 the shuttle-boxes are in the same position as in Fig. 55, but the threads are in opposite positions, the shuttle-carrying thread 3' being in the top position in box 7 and the shuttle-carrying thread 2' being in the bottom position in box 8. These wefts remain in these boxes thus reversed in position for the next two sheddings. The boxes in the meantime are turned in the direction of the arrows, placing the box 10 in the top position and box 9 in the bottom position, thread 1' being in box 10, its initial position, and thread 4' being in the box 9, its initial position, both these threads being unemployed until the third shedding. After the passage of the threads through the third shedding their reversal in the front boxes and their passage through the fourth shedding into the boxes, as seen in Fig. 58, the thread 4' will be in box 10 and thread 1' in box 9, or in opposite boxes from the initial position.

It will be seen, upon examining Figs. 55 to 58, that the boxes 7 and 10 are those that receive and deliver the threads from and to the top shedding, and that the boxes 8 and 9 are those that in like manner receive and deliver the thread from and to the bottom shedding. The boxes 7 and 8 are what might be called "mate boxes," as they are those that carry or receive one set of mate threads, and the boxes 9 and 10 are likewise in the same sense the other mate boxes. The shuttles carrying the mate threads are always in their respective boxes—that is, one set of mate threads is contained in the boxes 7 and 8, and the other set of mate threads are in the boxes 9 and 10. The mate threads alternate with each other in their positions in the boxes, and always re-enter the opposite box from that which they leave in their passage across the fabric in the process of formation.

At the next shedding the black and olive weft-threads again pass. The black thread in its last passage through the fabric was through the top and the olive was through the bottom half of the fabric, and they are now contained in the rear boxes on the rear of loom, the black thread 3' in box 7 and olive thread 2' in box 8. The boxes are therefore moved in the direction of the arrows, as shown in Fig. 58, to the position as seen in Fig. 59. This places the black thread 3' in position to be passed through the top shedding, as at its last passage in shedding 2, and olive weft-thread 2' is in position to be passed through the bottom, as at its last passage. The sheddings are then made to suit the pattern. The top is shed for the black thread 3' by lowering the selvage chain-thread 5 and by raising black chain-threads 3 and lowering 1, 2, and 4 for two squares to the left of the selvage-chain-thread to place the weft-thread 3' on the face, and by lowering black chain-threads 3 and raising threads 1, 2, and 4 for the next two squares to place the weft-thread 3' on the back. The next single square is shed to place thread 3' on the face by raising chain-thread 3 and lowering threads 1, 2, and 4. The bottom shedding is made to suit the olive thread 2' by raising the selvage chain-thread 6 and raising the olive chain-threads 2 and lowering threads 1, 3, and 4 for two squares to place the weft-thread 2' on the back, and by lowering chain-thread 2 and raising chain-threads 1, 3, and 4 for the next two squares to place the thread 2' on the face, and by raising thread 2 and lowering threads 1, 3, and 4 at the next single square to place the weft-thread 2' on the back. This forms the fifth double shedding through which the weft-threads are passed from the rear to the front, and are seen in position in the sheddings in Fig. 15 and in the side view of the same in Fig. 14. The threads being beaten up form the first half of the third double pick. The position of the weft-threads as they appear at the center is seen in Fig. 22, Sheet 3, and in the opened-out fabric in process of construction, as seen in Fig. 34 of Sheet 5, and section of the same, as seen in Fig. 35.

The sixth double shedding is formed by shedding the top for olive weft-thread 2' by raising selvage chain-thread 5 and by lowering olive chain-thread 2 and raising threads 1, 3, and 4 for two squares to the left of chain-thread 5, the next two squares being shed to have the weft-thread 2' on the face by raising chain-threads 2 and lowering chain-threads 1, 3, and 4. The next single square is shed to have the weft-thread 2' on the back by lowering chain-threads 2 and raising chain-threads 1, 3, and 4. The bottom part is shed for the weft-thread 3' by lowering selvage chain-thread 6 and lowering chain-threads 3 and raising threads 1, 2, and 4 for two squares to the left of chain-thread 6 to place the weft-thread 3' on the face. The next two squares are shed to have the weft-thread 3' on the back by raising chain-threads 3 and lowering chain-threads 1, 2, and 4. The next single square is shed to have the black weft-thread 3' on the face by lowering the black chain-thread 3 and raising chain-threads 1, 2, and 4. The shuttles are then turned in the direction indicated by the arrows in Fig. 14 and are passed through the double sheddings and are seen in place in Fig. 17. A side view of the edge of the same is seen in Fig. 16, where the black weft-thread 3' will be seen on the outside of the turn, having been passed toward the cloth in the process of transferring. The threads being beaten up complete the third double pick and will be seen in position in Fig. 23, Sheet 3, as they lie in the loom. Their position in the opened-out fabric in process of construction will be seen in plan in Fig. 36 and in section in Fig. 37 of Sheet 5. The position of the shuttles carrying the weft-threads will be seen in Fig. 60, the shuttle-carrying weft-thread 2' being in box 7 and the shuttle-carrying weft-thread 3' being in box 8. This is their original or initial position, as shown in Fig. 55, Sheet 1. The shuttles in the rear boxes are turned in the direction indicated by the arrow in Fig. 60 to the position as shown in Fig. 61, Sheet 1, thread 4' being placed in top position and thread 1' in the bottom position, as at the conclusion of their last passage. This necessitates shedding the top for white weft-thread 4' and the bottom for red weft-thread 1', or top for ground and bottom for figure.

The seventh double shedding to suit the weft-threads is formed by lowering selvage chain-thread 5 of the upper half and shedding the three squares to the left of the same to have the weft-thread 4' on the face by raising chain-threads 4 and lowering threads 1, 2, and 3. The next two squares are shed to have the white weft-thread 4' on the back by lowering chain-threads 4 and raising chain-threads 1, 2, and 3. The shedding of the lower half is made to suit the red weft-thread 1' by raising the selvage chain-thread 6 and shedding the next three squares, to have the red weft-thread 1' on the back by raising the chain-threads 1 and lowering the chain-threads 2, 3, and 4. The next two squares are shed to have the weft-thread 1' on the face by lowering chain-threads 1 and raising threads 2, 3, and 4. Through these sheddings the weft-threads are passed, white weft-thread 4' in the upper and red thread 1' in the lower shedding. They will be seen in position in Fig. 19 and in side view of the same in Fig. 18 of Sheet 3. The threads being beaten up form the first half of the fourth double pick. The position of the threads at the center or turn will be seen in Fig. 22, and in the opened-out fabric in Fig. 38 in plan and Fig. 39 in section of the same. The shuttles are now turned in the direction indicated by the arrows in Fig. 18, placing thread 1' opposite the top and thread 4' opposite the bottom shedding; the sheddings to suit the same are made by shedding the top half for the red weft-thread 1' and the bottom for the white weft-thread 4'.

The eighth double shedding is formed by raising selvage chain-thread 5 and shedding the next three squares to have the red weft-thread 1' on the back by lowering red chain-threads 1 and raising threads 2, 3, and 4. The next two squares are shed to have the red weft-thread 1' on the face by raising the red chain-threads 1 and lowering threads 2, 3, and 4. The lower half is shed by lowering selvage chain-thread 6 and shedding the next three squares to have the white weft-thread on the face by lowering chain-threads 4 and raising the threads 1, 2, and 3. The next two squares are shed to have the weft-thread 4' on the back by raising chain-threads 4 and lowering chain-threads 1, 2, and 3. Through these sheddings the weft-threads are passed and will be seen in position in Fig. 21 and in edge view, Fig. 20. The weft-thread 1' is on the outside, being placed there by turning that thread toward the cloth in transferring from one side to the other. The threads being beaten up form the completion of the fourth double pick, and will be seen in the position they occupy in the loom in Fig. 25, Sheet 3, and in the opened-out fabric in plan in Fig. 40 and in section in Fig. 41. The position of the shuttles in the rear boxes is seen in Fig. 62, Sheet 1, the threads occupying the same boxes that they occupied in the beginning, as in Fig. 55. The boxes are now moved in the direction indicated by the arrow in Fig. 62 to the position as seen in Fig. 55, and the sequence of operation is again gone over in regular order as before. Thus it will be seen that there are required four double picks or eight double sheddings to pass the weft-threads from and return the same to their initial positions.

Upon examining the plan of the fabric in Fig. 40 it will be seen that the different weft-threads are placed alongside each other in all possible combinations excepting the placing of the mate weft-threads alongside each other.

To properly place the mate threads alongside of each other, one must be introduced into the fabric after the other. In the present method of introducing the mate weft-threads the mate threads are simultaneously introduced from opposite selvages, which places one of the mate threads in front or in advance of the other in one half of the fabric and back of the other in the other half of the fabric, reference now being had to the direction of the length of the fabric, and when the mate threads are again introduced each color will be placed alongside of itself in both halves. Thus if a black thread is introduced into the top shedding and the olive in the bottom shedding and then at the next passage the olive thread is passed through the top shedding and the black thread through the bottom shedding, this places the olive thread in front or in advance of the black thread in the top half and the black in front or in advance in the bottom half. At the next introduction the black thread will be passed through the bottom, placing it alongside of the previous insertion of the black thread and the olive in the top alongside of the previous insertion of olive thread, and at the next passage the olive thread will be laid in the bottom and the black in the top. This places the two picks of the same color of weft-thread alongside of each other, and, furthermore, in the two halves of the fabric the same picks will be occupied by the other mate weft-threads.

The mechanism shown in Fig. 1, Sheet 1, is capable of weaving a continuous pattern across the full width of the fabric. If it is desired that the pattern shall extend but half-way across and be repeated, or if the pattern is such that by the present ordinary method of weaving it would be made with a point tie-up and woven flat, the pattern extending from selvage to selvage, then in the present-described method one-half of the needles will answer. The cords are then connected as follows: The cord governing the white chain-thread 4 of the top and that of red chain-thread 1 of the bottom are tied together, red thread 1 of the top and white thread 4 of the bottom, olive thread 2 of the top and black thread 3 of the bottom, and black thread 3 of the top and olive thread 2 of the bottom. One cord with two mails may be substituted for the two cords by having the mails the proper distance apart to suit the double sheddings. In this manner of operating the needles and cords but one side of the fabric is considered—that is, the top or face—and the cards would be punched in the following order to form the two sides, as hereinbefore described: first, punched for olive; second, for black; third, for red; fourth, for white; fifth, for black; sixth, for olive; seventh, for white, and eighth for red. In the bottom half the threads will be properly raised and lowered to suit the introduction of the mate threads, as before described, as may readily be seen upon comparing the positions of the several chain-threads in their positions in the double sheddings, as shown in Figs. 3, 5, 7, and 9 of Sheet 2, and Figs. 15, 17, 19, and 21 of Sheet 3. If I place the two figure weft-threads in what may be termed the "top boxes" 7 and 10 and the two ground-threads in what may be termed the "bottom boxes" 8 and 9, the order of shedding will be as follows: first, black or figure for top and olive or ground for bottom; second, olive or ground for top and black or figure for bottom; third, red or figure for top and white or ground for bottom; fourth, white or ground for top and red or figure for bottom; fifth, olive or ground for top and black or figure for bottom; sixth, black or figure for top and olive or ground for bottom; seventh, white or ground for top and red or figure for bottom; eighth, red or figure for top and white or ground for bottom. If I take the top sheddings, it will be seen that the order of shedding is, figure, ground, figure, ground. This passes the threads from one side of the fabric to the other or from one selvage to the other. In the next four sheddings it will be in the same alternation reversed—viz., the fifth shedding is olive for top and black for bottom; sixth, black or figure for top and olive or ground for bottom; seventh, white or ground for top and red or figure for bottom, and, eighth, red or figure for top and white or ground for bottom. Thus the second series of four sheddings alternate, ground, figure, ground, figure, taking, as before, the top half. If we place a figure and ground weft-thread in the top boxes and a figure and ground weft-thread in the bottom boxes, the order of shedding is as follows, taking, as before, the top half: ground, figure, figure, ground for the first four and figure, ground, ground, figure for the second four.

In the method of weaving described in my said patent, No. 415,146, the order of the sheddings was figure, ground, ground, figure, and then figure, and so on, shedding twice for each in succession, as there were but two weft-threads and they always in action; but in the present case, there being four weft-threads and two in action at one time, there is a choice as to which threads shall be paired with each other. If I pair a ground and figure thread together, the first-described sheddings will be used, and if I place the two figure-threads on one side and the two ground-threads on the opposite side, then the sheddings as described in the second series will be used, both of which will produce the same effect, and in fact the same pattern may be produced with either, as desired.

Fig. 42, Sheet 6, is a diagram illustrating the component parts of a loom as used to form the fabric, in which the chain-threads are over the same color weft-threads on the face of the fabric, but on the back of the same a figure weft-thread will have over it the chain-threads of the other figure weft-thread, and in like manner the ground weft-threads will have their own color chain-threads over them on the face, but the opposite color ground chain-threads on the back. This is the manner of placing the chain-threads as at present used.

In Fig. 42, Sheet 6, the Jacquard mechanism is such as is ordinarily used in looms of this class, and is provided with journals for lifting all the chain-threads of the color corresponding to the color of the weft-thread introduced. In this case it performs that office, but also lifts the chain-threads that are to be on the back of the weft-thread that is to be passed through the lower half of the fabric. The jacquard is divided into two parts, which are operated alternately, one half controlling the cords that operate the figure chain-threads and the other half the ground-threads, the journals operating on opposite parts to those operated upon by the jacquard. Thus if the journal of the figure-chain is lifted the jacquard of the ground is lifted, and vice versa. The pattern-cylinder operates once for two movements of the journals and Jacquard apparatus. Thus one-half the cards are required in this mechanism, as compared with the mechanism shown in Fig. 1, Sheet 1.

The stationary board is indicated at 38, lifting-board 40, guide-boards 42 and 44. The cords 51 and 52 operate the ground chain-threads of the upper half and the figure chain-threads of the bottom half. The journal 55 operates the cords 51, and the journal 56 operates the cords 52. The cords 51 control the ground-threads 4 of the upper and figure-threads 3 of the lower half. The cords 52 control the ground-threads 2 of the upper and figure-threads 1 of the lower half. The stationary board 39, lifting-board 41, and guide-boards 43 and 45, together with the journals 57 and 58, operate the cords 53 and 54, which in turn operate the figure chain-threads of the top and the ground chain-threads of the bottom half. The journal 57 operates the cords 54, and the journal 58 operates the cords 53. The cords 54 control the figure chain-threads 1 of the upper half and ground-threads 2 of the lower half. The cords 53 control the figure chain-threads 3 of the upper and ground chain-threads 4 of the lower half.

The numeral 11 indicates the reed through which the chain-threads pass.

7, 8, 9, and 10 are the shifting boxes on the rear of the loom; 13, the whip-roller over which the chain of the upper half passes, and 14 the whip-roller over which the chain of the lower half passes.

59 are the lingos or weights attached to cords 51, 52, 53, and 54.

46 is the pattern or card cylinder, and 47 indicates the cross-needles operated by the card-cylinder to place the cords 51, 52, 53, and 54 on the lifting-boards 40 and 41. The card-cylinder moves after every two sheddings and remains stationary until both the lifting-boards have operated.

The several parts are in the proper position to form the double shedding for the passage of the figure weft-thread 3' in the upper and ground weft-thread 2' in the lower half of the fabric. The journal 58, which controls the lifting of the entire set of black chain-threads 3 in the upper half and the white ground chain-threads 4 of the lower half, is raised, as will be seen upon examination of Fig. 44, Sheet 7, where it will be seen that the chain-threads 3 of the upper half and 4 of the bottom half are raised. This will place the black chain-threads 3 over the black weft-thread 3', where it appears on the face, and chain-thread 4 over the weft-thread 2', where it appears on the back. If none of the cords operated by the lifting-board 40 were raised, the weft-thread 3' would appear on the face all the way across and the weft-thread 2' would be on the back. At the part where the figure weft-thread is to be on the back the pattern-card engages the cords of the ground-ply with the lifting-board 40. This raises the ground chain-threads and leaves the other figure-ply chain-thread on the bottom. When the ground-ply chain-threads are lifted for the top, the same cords lift the two-figure-ply chain-threads on the back and leave the proper ground-ply chain-thread down, so as to form the proper shedding for the ground weft-thread that is being introduced simultaneously with the figure weft-thread. This manner of procedure holds good for all the several sheddings required to be made, as will be seen upon examining the succeeding figures, which are arranged to produce the same pattern as sheddings shown in Figs. 15, 17, 19, and 21 of Sheet 3—that is, the fabric shown opened out in Figs. 34 to 41 of Sheet 5.

I have shown only the last two double picks of the pattern, as the others are the same as those shown, excepting only the position of the chain-threads with reference to the weft-threads. In all other respects they are exactly alike.

In Fig. 44 the top is shed for the black-figure weft-thread 3' by lowering the selvage chain-thread 5 and raising the chain-threads 2 and 4 in the third and fourth squares of the pattern to the left of the selvage chain-thread. This places the figure weft-thread 3' on the back. All of the black chain-threads are lifted by the journal and make the proper shedding to place the black weft-thread on the face in the squares of pattern for the two to the left of the selvage chain-thread and the one on the extreme left. In these there is no lift of the ground chain-threads, and they, together with the other figure chain-threads, form the shedding for the back. In the third and fourth squares the red chain-threads form the shedding for the back. Thus the black chain-threads 3 are over the black weft-thread 3' on the face, and the red chain-threads 1 are over the black weft-threads on the back.

The shedding for the bottom for the olive ground-thread is controlled by the manner in which the heddle-cords are attached to the top cords, and no farther special provision is necessary. Thus chain-threads 4 are attached to the same journal as top chain-thread 3, or each individual cord is attached to the cord operating the top chain-thread 3, and when that cord is lifted the bottom thread 4 will also be lifted. The same is true of the rest of the chain-threads. The selvage chain-thread 6 is lifted and the two squares of pattern are shed with the threads 4 raised and 3, 1, and 2 lowered. The next two are shed with threads 2 lowered and 3, 4, and 1 raised. The next single square is shed with thread 4 raised and 3, 1, and 2 lowered. Through these two sheddings the weft-threads are passed, the black in the top and the olive in the bottom, and are seen in edge view, Fig. 43, and when beaten up form the first half of the third double pick, and are seen in place in Fig. 51, with the black weft-thread between the olive weft-thread and the cloth, as in Fig. 22, Sheet 3. The weft-threads are then turned in the direction indicated by the arrows in Fig. 43, which movement places the black weft-thread opposite the bottom and thread 2' opposite the top halves. The sheddings for the same are made by placing the olive chain-threads 2 on the outside of the top and red chain-thread 1 on the inside of the bottom shedding by lifting the journal 56 and the cords 52, which it governs. The selvage chain-thread 5 of the top is raised and the selvage-thread 6 of the bottom is lowered. The two squares to the left of the selvage-threads, as well as the last square to the left of the top and bottom, are shed so as to place the weft-thread 2' on the back of the top and the weft-thread 3' on the face of the bottom by lifting threads 3 1 of the top and threads 4 2 of the bottom in these portions by the raising of the board 41 and the cords 53 and 54. Through this double shedding the weft-threads are passed, the weft-thread 2' in the top and the weft-thread 3' in the bottom, and they are seen in place in Fig. 46 and in edge view, Fig. 45. These being beaten up form the completion of the third double pick. The threads are seen in position in Fig. 52, which is like Fig. 23 of Sheet 3, except with relation to the chain-threads on the back, which in Fig. 52 are white chain-threads 4 over the olive weft-thread 2' and red chain-threads 1 over black weft-thread 3'. It is to be understood that the word "over" refers to the position of the threads as they appear when on the face of the fabric, and not to the position they occupy in the loom.

The next shedding is for the white weft-thread 4' in the top and red weft-thread 1' in the bottom. This is made by presenting the next card of the pattern on the cylinder 46 to the cross-needles 47 and raising the journal 55, and with it the cords 51, thereby raising all the white chain-threads 4 of the upper half and black chain-threads 3 of the lower half. The selvage chain-thread 5 of the upper half is lowered and the thread 6 of the lower half is raised. The two squares of pattern on the left are shed to place the thread 4' on the back by raising threads 1 and 3 of the top and to place thread 1' on the face of the bottom by raising threads 2 and 4. This is accomplished by raising the lifter-board 41 and cords 53 and 54. The weft-threads are passed through this double shedding, the white weft-thread 4' in the top and red weft-thread 1' in the bottom, and the wefts are seen in position in Fig. 48 and in edge view, Fig. 47. The threads being beaten up form the first half of the fourth double pick and are seen in position in Fig. 49. The shuttles are then turned in the direction indicated by the arrows in Fig. 47, the red weft-thread 1' to the top and white weft-thread 4' to the bottom.

The next shedding is for weft-thread 1' in the top and 4' in the bottom. The journal 57 is raised, and with it the cords 54, raising all the chain-threads 1 of the top and 2 of the bottom and allowing all of the threads 3 of the top and 4 of the bottom to be down. The selvage chain-thread 5 of the top is raised and 6 of the bottom is lowered. For three squares of pattern to the left of the selvage-thread the threads 2 and 4 are raised to place the weft-thread 1' on the back of the top, and in like manner threads 1 and 3 of the bottom half are raised to place the weft-thread 4' on the face in the bottom half of the fabric. This is accomplished by lifting the board 40, and with it such of the threads as are desired. Through this double shedding the weft-threads are passed, red thread 1' in the top and white weft-thread 4' in the bottom, and they are seen in position in Fig. 50 and in edge view, Fig. 49. The threads being beaten up form the completion of the fourth double pick, and are seen in place in Fig. 54, which is like Fig. 25 of Sheet 3, except that the chain-threads 3 are on the back of the fabric over weft-thread 1' and chain-threads 2 are on the back of the fabric over weft-thread 4'. This method of shedding, so far as one-half is concerned, is the same as at present used, and in the foregoing description I have shown how the same may be adapted to my method of forming two paths side by side in correct relation to the mate weft-threads, which are simultaneously introduced through the double sheddings.

Either of the two described methods of shedding the chain-threads may be employed in separating the latter for the introduction of the weft-threads, as hereinbefore described, care being taken to have the jacquard operated and the journals lifted in the manner hereinbefore explained.

In Fig. 63 is shown a cross-section of the fabric as made by the first method of shedding of that in which the same color-chain is over the same weft-thread on the face and back. It will be seen that the chain-threads pass from either side to the center and then at the next pick pass to the opposite outside, thus forming a close tight bind between the two plies.

In Fig. 64 is seen a longitudinal section of a fabric made by the second method of shedding of that in which a weft-thread has its own color-chain thread over it on the face but not on the back of the fabric. The figure weft-threads have the opposite figure chain-threads over the same on the back, and the same is true of the ground weft-threads. Thus the red weft-thread has a red chain-thread over it on the face and a black on the back, the black weft-thread has the black chain on the face and red on the back, the olive ground-thread has the olive chain on the face and white on the back, and the white weft-thread has the white chain-thread on the face and the olive chain-thread on the back. It will be seen that the chain-threads in their passage from one side of the fabric to the other in the formation of the figure pass between two picks or are in the center for two picks. In the corresponding transfer in the other fabric they take a perfectly straight course from one side to the other and at right angles to the sides of the fabric. This would seem to make a less elastic binding between the two plies than that as shown in Fig. 63. Either of these methods may be practiced without departing from the spirit of my invention, which, broadly considered, is the forming of a two-ply figured fabric with four separate colors, two colors for the figure-threads and two for the ground-threads, both weft and chain threads, the weft-threads being passed through the fabric in pairs or mates and then being taken out of action and the other pair of mate figure and ground weft-threads being then passed through simultaneously, and these then being taken out of action and the first pair again passed through and the operation continued.

The several methods of placing the shuttles in the boxes so as to pass the same through in the orders described may be employed as desired, the due order of the shedding for the particular manner of placing the weft-threads being observed.

The pattern may be carried the full width or part the way, as desired, and any number of repeats desired may be used.

What I claim is—

1. The method of weaving two-ply figured fabrics wider than the loom, which consists in forming two parallel paths or sheds in the chain-threads at each double shedding—one for a figure weft-thread and one for a ground weft-thread—then introducing mating weft-threads into the sheds thus formed from the selvage edges toward the center, then repeating the shedding, shedding for ground the half just shed for figure and the reverse, and again introducing the weft-threads, carrying each through the half just traversed by the other, repeating the shedding and introducing a second pair of mating weft-threads from the selvage edges toward the center, carrying each through its own shed, then shedding for ground the half just shed for figure and the reverse, and again introducing the second pair of mating weft-threads, carrying each through the half just traversed by the other.

2. The method of weaving two-ply four-color figured fabrics wider than the loom, which consists in forming two parallel openings or sheds in the chain-threads at each double shedding, and in simultaneously introducing a figure and ground weft-thread into their respective sheds at each shedding in the following order: in the first shedding carrying mating figure and ground weft-threads from opposite selvages toward the center, and at the next shedding carrying the weft-threads to opposite selvages to those from which they started, then in the next two double sheddings carrying a second pair of mating weft-threads from selvage to selvage, in the next two double sheddings returning the first pair of mating weft-threads to the selvages from which they started, and in the next two double sheddings returning the second pair of mating weft-threads to the selvages from which they started.

3. The method of weaving two-ply figured fabrics composed of two sets of mate weft-threads and four sets of chain-threads colored to match said mate threads, which consists in forming double sheddings in the chain-threads at each of such double sheddings, forming two parallel openings or sheds in the chain-threads—one for a given figure weft-thread and one for its mate ground weft-thread—by passing to that side of either path on which its respective weft-thread is to appear on the surface of the fabric chain-threads of the same color as said weft-thread and introducing a figure weft-thread and mate ground weft-thread simultaneously into the different portions of each double shedding, at the first double shedding introducing the mate weft-threads from the selvages toward the center of the fabric, at the second shedding shedding in the same manner for figure the half just shed for ground and for ground the half shed for figure, and again introducing the mate weft-threads, carrying each through the half just traversed by the other and from the center toward the selvages of the fabric.

4. The method of weaving two-ply four-colored figured fabrics wider than the loom and containing two pairs of mated weft-threads and chain-threads colored to match, in which the chain-threads are formed into double sheddings, each of which presents two parallel paths—one for a figure-weft and one for a ground-weft—which consists in forming each double shedding by passing to the extended positions on the opposite sides of the normal plane of the warp those of the chain-threads matching in color the wefts which are to appear upon the surfaces of the fabric, respectively, and introducing the mating wefts into the double sheds in the following order, to wit: in the first two double sheddings carrying the first pair of wefts from the selvages to the center and thence to the selvages opposite those from which they respectively started, and then in the next two double sheddings carrying the second pair of weft-threads from selvage to selvage in the same manner.

5. The method of weaving two-ply figured four-colored fabrics wider than the loom and containing two pairs of mated weft-threads, all of different color, and chain-threads in series of four, colored to match the weft-threads, which consists in forming two openings or sheds in the chain-threads at each double shedding, one for figured weft-thread and the other for the mating ground weft-thread and in so doing passing to the extended position on the outside of either shed where a given weft-thread is to appear on the surface those of the chain-threads which are colored to match that weft-thread, and in then simultaneously introducing the mating weft-threads into each of such sheds in the following order, to wit: in the first two sheddings carrying the first pair of weft-threads from the selvages to the center and thence to opposite selvages from which they started, then in the next two sheddings carrying in like manner the second pair of weft-threads from selvage to selvage, then in the next two sheddings returning the first pair of weft-threads to the selvages from which they started, and then in the next two sheddings returning the second pair of weft-threads to the selvages from which they started.

In testimony whereof I have hereunto set my hand this 15th day of November, A. D. 1889.

ABRAM D. EMERY.

Witnesses:
  H. J. FULLER,
  WALTER T. EMERY.